Jan. 1, 1952 — G. E. RENFRO — 2,580,595
FLOW CONTROLLING DEVICE
Filed Nov. 23, 1945 — 2 SHEETS—SHEET 1

INVENTOR.
George E. Renfro
BY
Attorney

Jan. 1, 1952  G. E. RENFRO  2,580,595
FLOW CONTROLLING DEVICE

Filed Nov. 23, 1945  2 SHEETS—SHEET 2

INVENTOR.
George E. Renfro
BY
Attorney

Patented Jan. 1, 1952

2,580,595

UNITED STATES PATENT OFFICE 2,580,595

FLOW CONTROLLING DEVICE

George E. Renfro, El Segundo, Calif.

Application November 23, 1945, Serial No. 630,377

18 Claims. (Cl. 251—167)

This invention has to do with a flow controlling device and it is a general object of the invention to provide a device in the nature of a line blind applicable to conduits that the angularly disposed relative to each other, and which device involves, generally, a body, a flow controlling plate, and means for sealing the plate.

The usual line blind involves an elongate tubular body or assembly of parts forming a body and the plate usually operates to extend across the passage through the body. Such a device or fitting is generally connected in a line between opposed parts of the line, and it generally involves a number of bolts or fastening devices requiring that it be operated in a manner similar to a flange connection.

It is an object of my present invention to provide a flow controlling device adapted to be inserted in a pipe line as an angle fitting rather than between opposed ends of a straight line. The device that I have provided involves, generally, tubular body parts that are angularly related, say, for example, at right angles to each other, and these parts may form an element or unit applicable to a pipe line in the manner that an L or T fitting is used in such a line.

Another object of my invention is to provide a flow control device or line blind which involves a single, simple control means. The device that I have provided involves a single control element or hand wheel which is operable to set or release the blinding plate and with my construction it is unnecessary for the operator to release any ties or fastening devices such as bolts or clamps, such as is usually required with the ordinary line blind.

Another object of my invention is to provide various improvements in the arrangement and formation of parts in a device of the general character referred to, whereby I provide a fitting that is simple in operation and construction, dependable and practical.

Figures 1, 2:
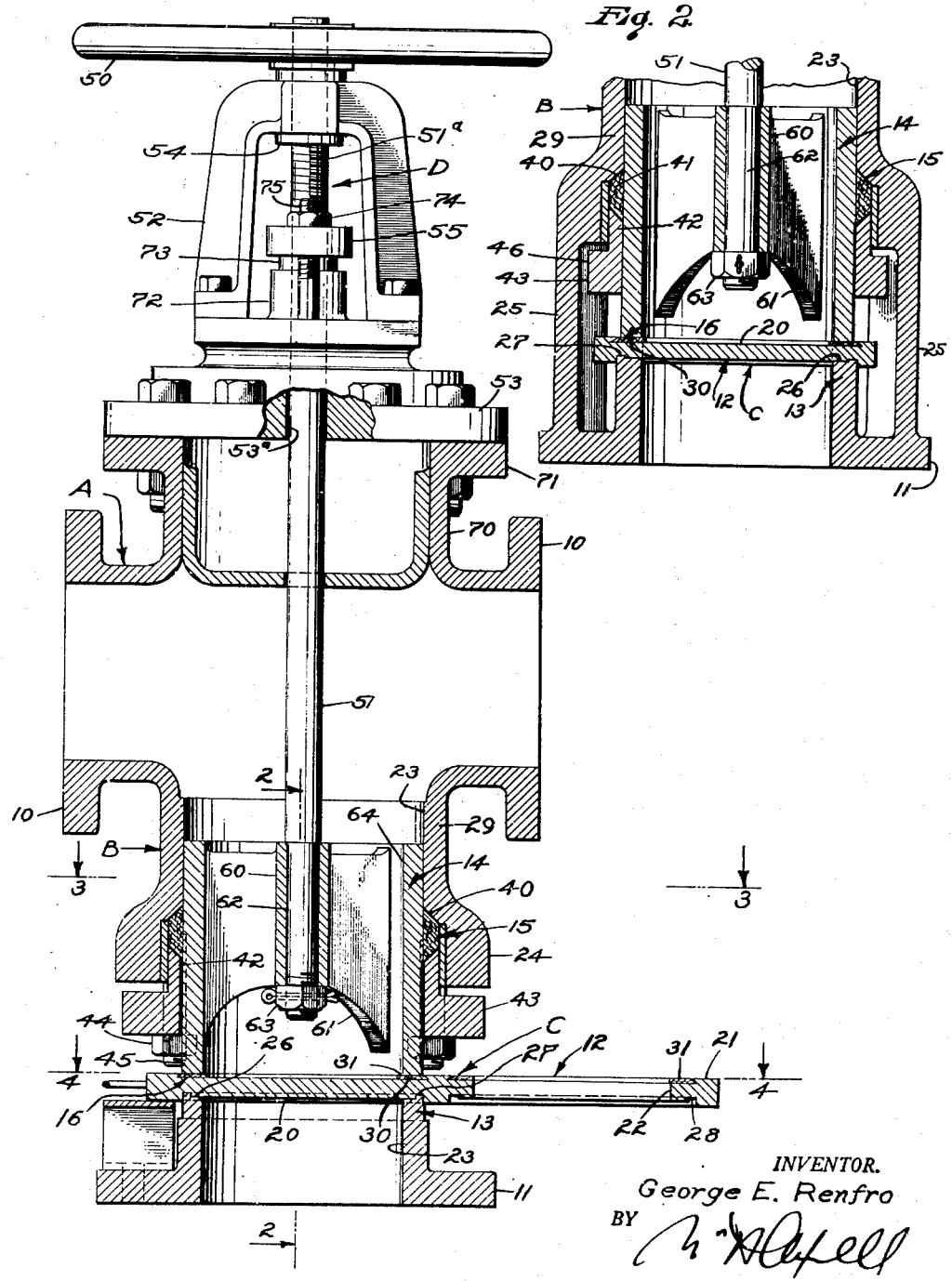
Figure 3:
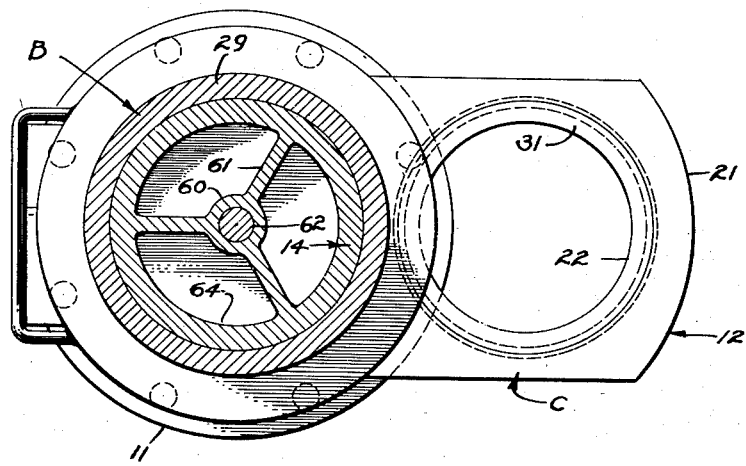
Figure 4:
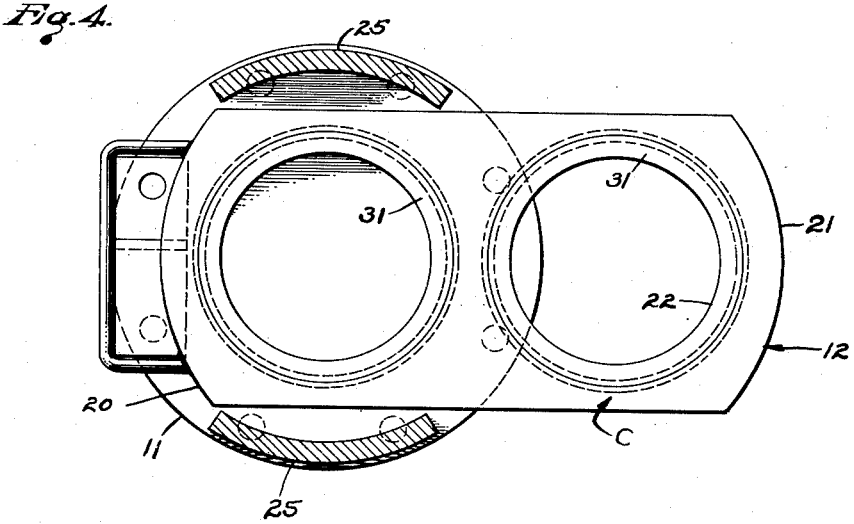

The various objects and features of my invention will be fully understood from the following detailed description of a typical preferred form and application of my invention, throughout which description reference is made to the accompanying drawings, in which:

Fig. 1 is a view showing a flow device embodying the present invention with most of the parts broken away to show in cross section. Fig. 2 is a sectional view taken as indicated by line 2—2 on Fig. 1. Fig. 3 is a transverse section taken as indicated by line 3—3 on Fig. 1, and Fig. 4 is a transverse section taken as indicated by line 4—4 on Fig. 1.

The flow control device that I have provided is in the nature of an angle fitting such, for example, as an L or a T, and in its preferred form it involves, generally, a body having angularly related tubular sections A and B, flow control means C applied to or arranged in connection with one of the body sections and operating means D for the means C. The body sections A and B are tubular so that they are in the nature of fluid handling conduits and they are joined together or are in communication so that fluid is free to flow between them. In accordance with the broader aspects of my invention the body sections A and B can be arranged at various angles relative to each other. However, in most cases it is most practical to arrange them at right angles to each other, or 90° apart, and in the preferred arrangement one of them such as the body section A is arranged transverse of the longitudinal or main axis of the device, while the other or section B is arranged longitudinally of and preferably parallel with and concentric to the longitudinal axis of the device. In the particular device shown in the drawings the body sections form a T-like fitting or, in other words, the section A which is transverse of the device is tubular and open at both ends so that it can be connected between opposing ends of a pipe line while the longitudinal section B joins or is connected into one side of the section A intermediate its ends so that its inner end is in communication with the section A.

In practice the body can be formed or built up in any suitable manner and the particular construction employed will depend upon the particular type or size of fitting involved. It is preferred in most cases to form the body sections A and B as a single integral casting. Further, since the device is to be connected in or to pipe lines the body sections are provided with means for making connection with fluid conduits or pipes. In the particular case illustrated connecting means or flanges 10 are provided at the ends of the section A and a connecting flange 11 is provided at the outer or projecting end of body section B.

The flow control means C that I have provided is carried by one of the body sections and in a fitting such as I have shown in the drawings it is carried by the longitudinal body section B, that is, it is arranged so that it controls flow at the section B. The flow control means involves, generally, a control plate 12, a seat 13 in the body, for instance in the body section B, to receive the plate, a clamp sleeve 14 in the body to engage and clamp the plate in sealing engagement with the seat, packing means 15 sealing between the sleeve 14 and the body and sealing means 16 between the sleeve 14 and the plate. My construction further provides a construction that may be considered either a portion of the flow control means or as a separate and distinct element of the structure, namely operating means D for the construction just described, and more particularly for the sleeve 14.

The plate 12 may be any suitable line blind or flow controlling plate. Characteristic of ordinary line blind plates I have shown a plate 12 having one closed or solid end 20 and an open end 21. The opening or aperture 22 in the open end 21 is in the case illustrated, the same diameter as the flow passage 23 through the body section across which the plate is arranged. When the plate 12 is in the position shown throughout the drawings, that is, when the solid or closed end 20 is in engagement with the seat 13, flow is completely shut off or stopped through the body section B. However, when the plate is in the reversed position, that is, when the open end 21 is in working position, then the opening 22 registers with passage 23 so there is free unobstructed flow through the body section B.

The seat 13 is an annular or ring-like element in the body section B faced to oppose the clamp sleeve 14. In the construction that I have provided the seat 13 is carried by the section B so that it is a fixed or permanent element of the construction and the body section B to accommodate the seat and the various other parts that I have provided, is formed so that it has an enlarged outer end portion including a collar 24 that joins the inner end portion and diametrically opposite spaced legs 25 which project from the collar longitudinally of the section B to support the flange 11 at the outer or projecting end of the body section B. In the preferred arrangement the seat 13 projects inwardly from the flange 11 which is supported by the legs 25 and there is a substantial space left between the innermost end or face 26 of the seat and the collar 24 which space accommodates the plate 12 and parts of the packing means 15, as will be hereinafter described. The seat being annular and being joined with the flange 11, as I have described, is in effect a part of the body section B and the opening through the seat acts as a part of the body opening conducting fluid through the device. The face 26 of the seat 13 may be formed or finished to have any desired cooperative engagement with the plate 12, for instance, it may be made to seal with the plate or, as shown in the drawings, it may be formed to act as a centralizer for the plate. In the particular construction illustrated a rib 27 projects from the face 26 and the two parts 20 and 21 of the plate 12 have annular channels or grooves 28 that receive the rib. The rib in fitting into the channel in the plate part 20 holds the solid part of the plate central across the body section B and when the end 21 of the plate is in use the rib fits the channel in that part of the plate to hold the plate opening 22 concentric with the body opening 23.

The clamp sleeve 14 is slidably supported in the body inward of the seat 13 and plate 12, in fact, in the particular construction illustrated it is slidably supported in the inner end portion 29 of the body section B at which part the body opening 23 is turned or finished to slidably support and guide the sleeve. The clamp sleeve is of considerable length and has its outer end 30 which faces the plate 12 shaped and finished to cooperate with the plate in the desired manner. In the particular construction illustrated the outer end of the clamp sleeve is flat and finished so that it is smooth, because the construction illustrated involves a sealing ring or gasket 31 carried by each plate portion, which gasket is shaped and proportioned to receive a flat clamping face. In the construction that I have illustrated the gaskets are carried in suitable recesses in the side of the plate that faces the sleeve and they are retained in suitable undercut grooves so that they do not become readily displaced.

The packing means 15 seals between the sleeve 14 and the body section B. The particular construction that I have illustrated involves a counterbore or packing carrying opening 40 in the collar portion 24 of the body section B, a body of packing 41 in the counterbore, and a follower 42 entering the counterbore to compress the packing. The follower has a flange 43 which is located between the collar 24 and the plate 12 and nuts 44 are carried on studs 45 which project from the collar 24 so that they engage the flange 43. By tightening the nuts 44 on the studs 45 the packing follower is moved inward to compress the packing so that it seals tight between the exterior of the sleeve 14 and the portion of the body which carries the packing. With the construction that I have provided the flange 14 has flattened sides 46 which enable it to be inserted between the legs 25 in order to be located in operating position where the follower enters the counterbore 40.

The operating means D acts to move or operate the clamp sleeve 14 and in accordance with the arrangement that I have provided the means D includes an operating member such as a hand wheel 50 located at the exterior of the device at one side of the body section A opposite the side from which the body section B projects. The particular operating means that I have illustrated involves generally a stem 51 connected to the sleeve 14, a yoke 52 projecting from a cover plate 53 applied to the body, a nut 54 carried by the yoke and operated by the hand wheel 50, and packing means 55 sealing around the stem 51.

The stem 51 in the arrangement illustrated is located concentric with the section B of the body and extends through or across the section A to enter the section B where it connects to the sleeve 14. In practice any suitable connection may be provided between the stem and sleeve which will connect these parts so that when the stem is moved the sleeve is moved with it. In the particular case illustrated a hub 60 is supported concentrically in the sleeve 14 by a plurality of spaced webs 61, and the stem 51 has a reduced end 62 carried in the hub where it is retained by a nut 63. With this construction the opening or passage 64 through the sleeve 14 is left practically unobstructed and the sleeve is effectively attached to the operating stem.

The particular body construction that I have illustrated involves an annular extension 70 on the side of the body section A opposite the body section B, which extension has a flange 71 at its outer end to which the head or cover plate 53 is attached.

The head or cover plate 53 has an opening 53ᵃ that passes the stem 51 and the packing means 55 provided to seal around the stem may be any suitable form of stem packing carried by the head. In the case illustrated the packing is carried in an extension 72 on the head and a packing follower 73 enters the extension and is operated by nuts 74 carried on studs 75.

The yoke 52 is attached to the head or cover plate 53 to project therefrom and rotatably supports the nut 54 which passes the threaded outer end portion 51ᵃ of the stem. The hand wheel 50 is attached to the nut 54 immediately beyond the yoke 52 and the construction is such that when the hand wheel is turned the nut is turned and the stem threaded in the nut is moved longitudinally either in or out, depending upon the direction in which the hand wheel is turned.

From the foregoing description it will be apparent that when the plate 12 is positioned as shown throughout the drawings and the hand wheel is operated so that the sleeve 14 is clamped against the plate, the end 30 of the sleeve engages the sealing gasket 31 carried by plate part 20 and the plate is held in position through engagement of the rib 27 on the seat 13 with the groove 28 in the plate part 20. With this construction flow from the section A to the section B is effectively closed or cut off. To open the blind or, in other words, to reverse the plate 12 it is merely necessary for the operator to turn the hand wheel 50 which causes the stem 51 to lift the sleeve 14 away from the plate, freeing the plate so that it can be lifted from the rib 27 and then turned end for end, or simply slid crosswise of section B; after which the hand wheel can be operated to move the sleeve back to clamping position so that the end 21 of the plate is clamped in position between the sleeve 14 and the seat 13. In this position the device is sealed against leakage of fluid and yet there is a free passage through the body to accommodate fluid.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In a device of the character described, a body having a transverse tubular section and a longitudinal tubular section with a collar portion, spaced legs projecting from the collar portion, and a flange carried by the legs, a seat carried by the flange, a flow control plate arranged between the legs and engaging the seat, a clamp sleeve in and in sealing engagement with the collar portion and engaging the plate in sealing engagement on that side of the plate opposite said seat, and means for operating the sleeve including a manually operated element at the exterior of the transverse section.

2. In a device of the character described, a body having a transverse section and a longitudinal section with a collar portion, spaced legs projecting from the collar portion, and a flange carried by the legs, a seat carried by the flange, a flow control plate arranged between the legs and engaging the seat, a clamp sleeve in the collar portion and engaging the plate in sealing engagement on that side of the plate opposite said seat, packing between the sleeve and collar portion, and means for operating the sleeve.

3. In a device of the character described, a body having a transverse section and a longitudinal section with a collar portion, spaced legs projecting from the collar portion, and a flange carried by the legs, a seat carried by the flange, a flow control plate arranged between the legs and engaging the seat, a clamp sleeve in the collar portion and engaging the plate, packing between the sleeve and collar portion, sealing means between the sleeve and plate, and means for operating the sleeve.

4. In a device of the character described, a body having a transverse section and a longitudinal section with a collar portion, spaced legs projecting from the collar portion, and a flange carried by the legs, a seat carried by the flange, a flow control plate arranged between the legs and engaging the seat, a clamp sleeve in and in sealing engagement with the collar portion and engaging the plate in sealing engagement on that side of the plate opposite said seat, and means for operating the sleeve including a stem attached to the sleeve and projecting through the longitudinal section and across the transverse section.

5. In a device of the character described, a body having a transverse section and a longitudinal section projecting from one side of the transverse section and having a collar portion, spaced legs projecting from the collar portion, and a flange carried by the legs, a seat carried by the flange, a flow control plate arranged between the legs and engaging the seat, a clamp sleeve in and in sealing engagement with the collar portion and engaging the plate in sealing engagement on that side of the plate opposite said seat, and means for operating the sleeve including a stem attached to the sleeve and projecting across the transverse section to project from the other side thereof where an end of the stem is accessible for operation.

6. In a device of the character described, a body having a transverse section and a longitudinal section projecting from one side of the transverse section and having a collar portion, spaced legs projecting from the collar portion, and a flange carried by the legs, a seat carried by the flange, a flow control plate arranged between the legs and engaging the seat, a clamp sleeve in and in sealing engagement with the collar portion and engaging the plate in sealing engagement on that side of the plate opposite said seat, and means for operating the sleeve including a stem attached to the sleeve and projecting across the transverse section to project from the other side thereof, and a manually operable member at the exterior of the body at said other side of the transverse section operatively connected with the stem to move it longitudinally.

7. In a device of the character described, a rigid body having two elongate angularly related sections with longitudinal flow passages therethrough, one section projecting from one side of the other section and having a laterally disposed opening intersecting the passage through said first mentioned section, an annular seat in the first mentioned section at said opening and concentric with said first mentioned section, a plate entered in the opening and arranged for sealing engagement with said seat, an imperforate tubular clamp element slidably carried in and in fluid-tight engagement with said first-mentioned section, said tubular clamp element arranged for sealing engagement with said plate and being movable into such engagement thereby holding said plate in sealing engagement with said seat, and means operating the clamp element longitudinally in said first mentioned section including an operating member at the exterior of said other section at the opposite side thereof, the clamp element being arranged for sealing engagement with said seat and operable into sealing engagement therewith when the plate is removed from between the clamp and seat.

8. In a device of the character described, a rigid body having two elongate angularly related sections with longitudinal flow passages therethrough, one section projecting from one side of the other section and having a lateral opening intersecting the passage in the first mentioned section and having an inwardly faced plate seat at the lateral opening, a flow controlling plate entered in said opening and arranged for sealing engagement with said seat, an imperforate tubular clamp element having one end portion slidably carried in and in fluid-tight engagement with the first mentioned section, the other end portion of the clamp element being arranged for sealing engagement with the plate and being movable into such engagement thereby holding said plate in sealing engagement with said seat, and means operating the clamp element longitudinally in the first mentioned section and relative to the seat and plate including an operating member at the exterior of the other section at the opposite side thereof, said other end portion of the clamp element being arranged for sealing engagement with said seat and operable into sealing engagement therewith when the plate is removed from between the seat and clamp element.

9. In a device of the character described, a rigid body having two angularly related sections with longitudinal flow passages therethrough, one section projecting from one side of the other section and having a side opening intersecting the passage therein, an annular seat in the first mentioned section at said opening, a flow controlling plate projecting into said opening arranged for sealing engagement with said seat, an imperforate tubular clamp element slidably carried in and in fluid-tight engagement with the first-mentioned section, said tubular clamp element arranged for sealing engagement with the plate and being movable into such engagement thereby holding the plate in sealing engagement with the seat, and operating means for the clamp element including, an operating member at the exterior of said other section at the opposite side thereof, a stem attached to the clamp element and projecting through the said other section, and an operating connection between the operating member and stem, the clamp element being arranged for sealing engagement with said seat and operable into sealing engagement therewith when the plate is removed from between the clamp element and seat.

10. In a device of the character described, a rigid body having two tubular angularly related sections with longitudinal flow passages therethrough, one section projecting from one side of the other and having a side opening intersecting the passage therein, an annular seat in the first mentioned section at said opening, a flow controlling plate entered in said opening arranged for sealing engagement with said seat, an imperforate tubular clamp element slidably engaged in and in fluid-tight engagement with the first-mentioned section, said tubular clamp element arranged for sealing engagement with the plate and being movable into such engagement thereby holding the plate in sealing engagement with said seat, and operating means for the clamp element including an operating member at the exterior of the other section at the opposite side thereof, the sections of the body being disposed at right angles to each other and the clamp element being arranged for sealing engagement with said seat and operable into sealing engagement therewith when the plate is removed from between the clamp element and seat.

11. In a device of the character described, a rigid body having a transverse section and a longitudinal section joining one side of the transverse section, each section having a flow passage therethrough, the longitudinal section having a lateral opening intersecting its passage and having an annular seat at the opening, a flow control plate extending into the longitudinal section through the opening and arranged for sealing engagement with the seat, an imperforate tubular clamp element slidable in and in fluid-tight engagement with the longitudinal section, said tubular clamp element arranged for sealing engagement with the plate and being movable into such engagement thereby holding the plate in sealing engagement with the seat, and a stem extending from the clamp element to the other side of the transverse section for operating the clamp element, the clamp element being arranged for sealing engagement with said seat and operable into sealing engagement therewith when the plate is removed from between the clamp element and seat.

12. In a device of the character described, a rigid body having a transverse section and a longitudinal section joining one side of the transverse section, each section having a flow passage therethrough, the longitudinal section having a lateral opening intersecting the passage in that section and having an annular seat at the opening, a flow controlling plate extending into the opening and arranged for sealing engagement with the seat, an imperforate tubular clamp element slidably supported in and in fluid-tight engagement with the longitudinal section, said tubular clamp element arranged for sealing engagement with the plate and being movable into such engagement thereby holding the plate in sealing engagement with the seat, and a single stem central of the longitudinal section and extending from the clamp element to the other side of the transverse section for operating the clamp element, the clamp element being arranged for sealing engagement with said seat and operable into sealing engagement therewith when the plate is removed from between the clamp element and seat.

13. In a device of the character described, a rigid body having a transverse section and a longitudinal section joining and projecting from one side of the transverse section, each section having a flow passage therethrough, the longitudinal section having a lateral opening intersecting the passage in that section and having an annular seat at the opening, a flow controlling plate extending into the opening and arranged for sealing engagement with the seat, an imperforate tubular clamp element slidably engaged in and in fluid-tight engagement with the longitudinal section, said tubular clamp element arranged for sealing engagement with the plate and being movable into such engagement thereby holding the plate in sealing engagement with the seat, and a stem extending from the clamp element through the said sections to the other side of the transverse section for operating the clamp element and having an engageable part at the exterior of the body at the said other side of the transverse section, the clamp element being arranged for sealing engagement with said seat and operable into sealing engagement therewith when the plate is removed from between the clamp element and seat.

14. In a device of the character described, a rigid body having a transverse section and a longitudinal section joining and projecting from one side of the transverse section, each section having a flow passage therethrough, the longitudinal section having a lateral opening intersecting the passage in that section and having an annular seat at the opening, a flow control plate extending into the opening and arranged for sealing engagement with the seat, an imperforate tubular clamp element slidably engaged in and in fluid-tight engagement with the longitudinal section, said tubular clamp element arranged for sealing engagement with the plate and being movable into such engagement thereby holding the plate in sealing engagement with the seat, and a single stem extending from the clamp element centrally through the longitudinal section and transversely through the transverse section to the other side of the transverse section for operating the clamp element from said other side of the transverse section.

15. In a device of the character described, a rigid body having two sections joined in angular relation to each other, the sections each having a flow passage therethrough, one section having a lateral opening intersecting the passage in that section and having an annular seat at the opening, a flow control plate extending into said opening and arranged for sealing engagement with the seat, an imperforate tubular clamp element slidably carried by said section opposing the plate and arranged for sealing engagement therewith, means for effecting a seal between the clamp element and said section, and operating means for the clamp element including an operating member at the exterior of the other section opposite the point at which the sections are joined for moving said plate into sealing engagement with said seat.

16. In a device of the character described, a rigid body having two tubular angularly related sections each having a flow passage therethrough, one section having a lateral opening intersecting the passage in that section and an annular seat at said opening, a flow control plate extending into said opening and arranged for sealing engagement with said seat, said plate opposing said seat, an imperforate tubular clamp element slidably carried by said section and opposing the plate, means for effecting a seal between the clamp element and said section, means for effecting a seal between the clamp element and the plate, and operating means for the clamp element including an operating member at the exterior of the other section, the clamp element being arranged for sealing engagement with said seat and operable into sealing engagement therewith when the plate is removed from between the clamp element and seat.

17. In a device of the character described, a rigid body having a transverse section and a longitudinal section each with a flow passage therethrough, the longitudinal section having a lateral opening intersecting the passage through that section, an annular seat in the longitudinal section around the passage therethrough and facing the transverse section, the seat being at the opening, a plate extending into the opening and arranged for sealing engagement with the seat, an imperforate tubular clamp element slidably carried in and in fluid-tight engagement with the longitudinal section, said tubular clamp element arranged for sealing engagement with said plate and being movable into such engagement thereby holding said plate in sealing engagement with said seat, and means for moving the clamp element longitudinally in the longitudinal section, the clamp element being arranged for sealing engagement with said seat and operable into sealing engagement therewith when the plate is removed from between the clamp element and seat.

18. In a device of the character described, a rigid body having a transverse tubular section and a longitudinal tubular section with a lateral opening communicating with the interior thereof, an annular seat in the longitudinal section around the opening therethrough and facing the transverse section, a flow control plate extending into the opening and having sealing engagement with the seat, an imperforate clamp sleeve slidably carried in and in fluid-tight engagement with said longitudinal section, said imperforate clamp sleeve arranged for sealing engagement with said plate and being movable into such engagement thereby holding said plate in sealing engagement with said seat, and screw means moving the clamp sleeve longitudinally in the longitudinal section, the clamp sleeve being arranged for sealing engagement with said seat and operable into sealing engagement therewith when the plate is removed from between the clamp sleeve and seat.

GEORGE E. RENFRO.

REFERENCES CITED

The following references are of record in the file of this patent:

UNITED STATES PATENTS

| Number | Name | Date |
|---|---|---|
| 1,022,375 | Mueller | Apr. 5, 1912 |
| 1,599,168 | Duncan | Sept. 7, 1926 |
| 2,340,499 | Zachow | Feb. 1, 1944 |